(12) United States Patent
Zhang et al.

(10) Patent No.: US 7,783,075 B2
(45) Date of Patent: Aug. 24, 2010

(54) BACKGROUND BLURRING FOR VIDEO CONFERENCING

(75) Inventors: Cha Zhang, Sammamish, WA (US); Li-wei He, Redmond, WA (US); Yong Rui, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 1106 days.

(21) Appl. No.: 11/422,693

(22) Filed: Jun. 7, 2006

(65) Prior Publication Data

US 2007/0286520 A1 Dec. 13, 2007

(51) Int. Cl.
*G06K 9/00* (2006.01)
*G06K 9/34* (2006.01)
*G06K 9/40* (2006.01)

(52) U.S. Cl. .................. 382/103; 382/173; 382/264

(58) Field of Classification Search ........ 382/100, 382/103, 173, 264, 243, 181, 224, 118, 154; 351/208; 348/169, 14.07; 342/90; 703/6; 702/77; 358/500; 345/418, 597
See application file for complete search history.

(56) References Cited

U.S. PATENT DOCUMENTS

| | | | |
|---|---|---|---|
| 6,415,054 B1 * | 7/2002 | Silverbrook et al. | 382/233 |
| 6,526,161 B1 | 2/2003 | Yan | |
| 6,665,454 B1 * | 12/2003 | Silverbrook et al. | 382/299 |
| 2001/0037191 A1 * | 11/2001 | Furuta et al. | 703/6 |
| 2004/0218827 A1 | 11/2004 | Cohen et al. | |

OTHER PUBLICATIONS

J. Connell, A.W. Senior, A. Hampapur, Y. L. Tian. L. Brown, S. Pankantil, "Detection and Tracking in the IBM PeopleVision System", IBM T.J. Watson Research Center, IEEE International Conference on Multimedia and Expo, 2004, pp. 1403-1406, 0/7803-8603-5/04.*
Connell, J., A. W. Senior, A. Hampapur, Y.-L. Tian, L. Brown and S. Pankanti, Detection and tracking in the IBM PeopleVision system, *IEEE Int'l Conf. on Multimedia and Expo*, 2004, vol. 2, pp. 1403-1406.
Elgammal, A., D. Harwood, and L. S. Davis, Non-parametric model for background subtraction, *European Conf. on Comp. Vision*, 2000, pp. 751-767.
Friedman, N., and S. Russell, Image segmentation in video sequences: A Probabilistic approach, *Proc. of the 13th Conf. on Uncertainty in Artificial Intelligence*, 1997, pp. 175-181.

(Continued)

*Primary Examiner*—Samir A. Ahmed
*Assistant Examiner*—Mehdi Rashidian
(74) *Attorney, Agent, or Firm*—Lyon & Harr, LLP; Katrina A. Lyon

(57) ABSTRACT

Background blurring is an effective way to both preserve privacy and keep communication effective during video conferencing. The present image background blurring technique is a light weight real-time technique to perform background blurring using a fast background modeling procedure combined with an object (e.g., face) detector/tracker. A soft decision is made at each pixel whether it belongs to the foreground or the background based on multiple vision features. The classification results are mapped to a per-pixel blurring radius image to blur the background. In another embodiment, the image background blurring technique blurs the background of the image without using the object detector.

16 Claims, 9 Drawing Sheets

OTHER PUBLICATIONS

Harville, M., A framework for high-level feedback to adaptive per-pixel, mixture-of-Gaussian background models, *European Conf. on Comp. Vision*, 2002, vol. 3, pp. 543-560.

Kolmogorov, V., A. Criminisi, A. Blake, G. Cross and C. Rother, Bi-layer segmentation of binocular stereo vision, *Comp. Vision and Pattern Recognition*, 2005, vol. 2, pp. 407-414.

Logitech Video Effects, http://www.logitech.com/index.cfm/products/videoeffects/information/US/EN,CRID=2448,CONTENTID=11070.

Lou, H., and A. Eleftheriadis, Model-based segmentation and tracking of head-and-shoulder video objects for real time multimedia services, *IEEE Trans. on Multimedia*, Sep. 2003, vol. 5, No. 3, pp. 379-389.

Mittal, A., and N. Paragois, Motion-based background subtraction using adaptive kernel density estimation, *Comp. Vision and Pattern Recognition*, 2004, pp. 302-309.

Rittscher, J., J. Kato, S. Joga, and A. Blake, A probabilistic background model for tracking, *European Conf. on Comp. Vision*, 2000, vol. 2, pp. 336-350.

Stauffer, C., and W. E. L. Grimson, Adaptive background mixture models for real-time tracking, *Comp. Vision and Pattern Recognition*, 1999, vol. 2, pp. 246-252.

Toyama, K., J. Krumm, B. Brumitt and B. Meyers, Wallflower: Principles and practice of background maintenance, *Proc. $7^{th}$ Int.l Conf. on Comp. Vision*, Sep. 1999, pp. 255-261.

Viola, P., and M. Jones, Rapid object detection using a boosted cascade of simple features, *Comp. Vision and Pattern Recognition*, 2001, Kauai, HI, vol. 1, pp. 511-518.

Wang, J. Y. A., and E. H. Adelson, representing moving images with layers, *IEEE Trans. on Image Processing*, 1994, vol. 3, No. 5, pp. 625-638.

Wren, C., A. Azarbayejani, T. Darrel, and A. Pentland, Pfinder: Real time tracking of the human body, *IEEE Trans. on PAMI*, 1997, vol. 19, No. 7, pp. 780-785.

Xiao, J. J., and M. Shah, Motion layer extraction in the presence of occlusion using graph cut, *Comp. Vision and Pattern Recognition*, 2004, vol. 2, pp. 972-979.

Xiao, R., M.-J. Li and H.-J. Zhang, Robust multi-pose face detection in images, *IEEE Trans. on CSVT*, Jan. 2004, vol. 14, No. 1, pp. 31-41.

Zhang, C., and Y. Rui, Robust visual tracking via pixel classification and integration, *Proc. of the $18^{th}$ Int'l Conf. on Pattern Recognition*, 2006, vol. 3, pp. 37-42.

European Search Report, Application No. PCT/US06/14268. Date of Completion: May 29, 2007, Date of Mailing: Nov. 6, 2007.

\* cited by examiner

BACKGROUND BLURRING FOR VIDEO CONFERENCING

BACKGROUND

Video conferencing has become more and more popular thanks to the emergence of high speed Internet and reduced prices of high quality web cameras. Wide-spread instant messaging software supports voice/video chatting, where people can view each other while talking. There are, however, privacy concerns with video conferencing. For instance, some people do not want to show their living rooms, bedrooms or offices to other people.

There are a number of approaches to overcoming the privacy issue with video conferencing. For example, some applications replace a talking face with a 3D animated avatar. It is fun to play with such effects, though the expressiveness of the avatars is often limited and cannot deliver information as rich as that conveyed by true faces. An alternative solution is to separate the foreground and background objects in the video, so that the background can be replaced by a different image or video. This would be ideal for preserving privacy while maintaining the effectiveness of the conversation, except that automatic video foreground/background segmentation is a very challenging task. In addition, human eyes are very sensitive to segmentation errors during background replacement, which demands the segmentation algorithm to be extremely accurate.

Existing approaches to preserving privacy in video conferencing are either too slow to be processed in real time, or assume a known background, or require a stereo camera pair. Few of them have achieved the efficiency, accuracy and convenience needed in real-world applications.

SUMMARY

The present image background blurring technique employs background blurring as an effective way to both preserve privacy and ensure effective communication during video conferencing. In one embodiment, the present image background blurring technique is a light weight real-time technique to perform background blurring using a fast background modeling procedure combined with an object detector/tracker, such as a face detector/tracker. A soft decision is made at each pixel whether it belongs to the foreground or the background based on multiple vision features. The classification results are mapped to a per-pixel blurring radius image which is used to blur the background.

In another embodiment, the image background blurring technique blurs the background of the image without using the object detector. In this embodiment, a background classification procedure is also used to create a probability map to determine the likelihood of each pixel in an image being background. The probability map is then used in blurring the pixels of the image.

It is noted that while the foregoing limitations in existing techniques for overcoming privacy issues described in the Background section can be resolved by a particular implementation of the image background blurring technique described, this technique is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the claimed subject matter will become better understood with regard to the following description, appended claims, and accompanying drawings where:

DETAILED DESCRIPTION

In the following description, reference is made to the accompanying drawings that form a part hereof, and in which is shown by way of illustration specific embodiments in which the invention may be practiced. It is understood that other embodiments may be utilized and structural changes may be made without departing from the scope of the present disclosure.

1.0 The Computing Environment

Before providing a description of embodiments of the present image background blurring technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
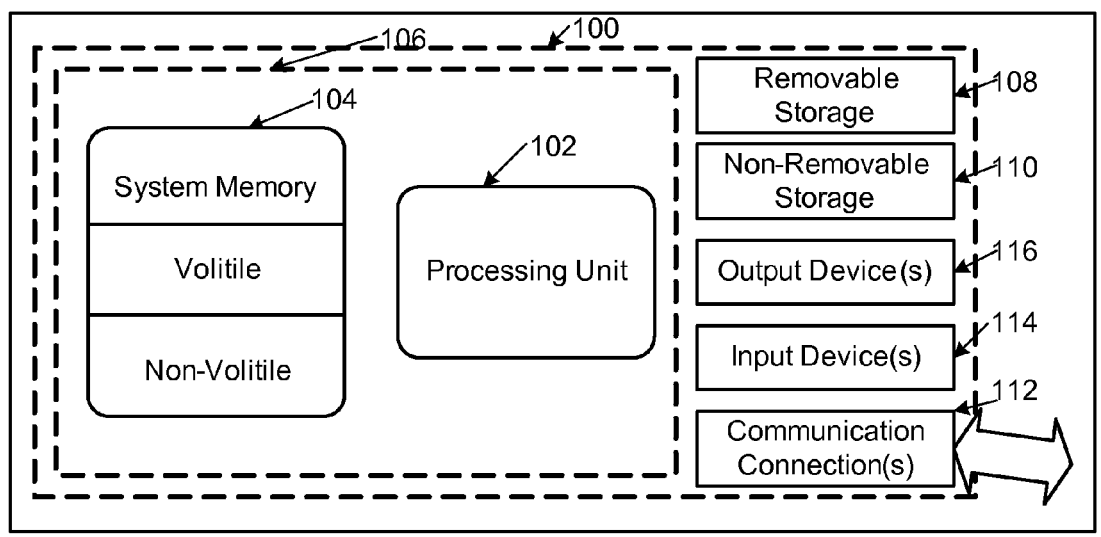
FIG. 1 is a diagram depicting a general purpose computing device constituting an exemplary system for implementing the present image background blurring technique.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, camera, microphone, pen, voice input device, touch input device, etc. In particular, one such input device is a video camera. Output device(s) 116 such as a display, speakers, printer, etc. may also be included. All these devices are well know in the art and need not be discussed at length here.

The present technique may be described in the general context of computer-executable instructions, such as program modules, being executed by a computing device. Generally, program modules include routines, programs, objects, components, data structures, and so on that perform particular tasks or implement particular abstract data types. The process may also be practiced in distributed computing environments where tasks are performed by remote processing devices that are linked through a communications network. In a distributed computing environment, program modules may be located in both local and remote computer storage media including memory storage devices.

Figure 2:
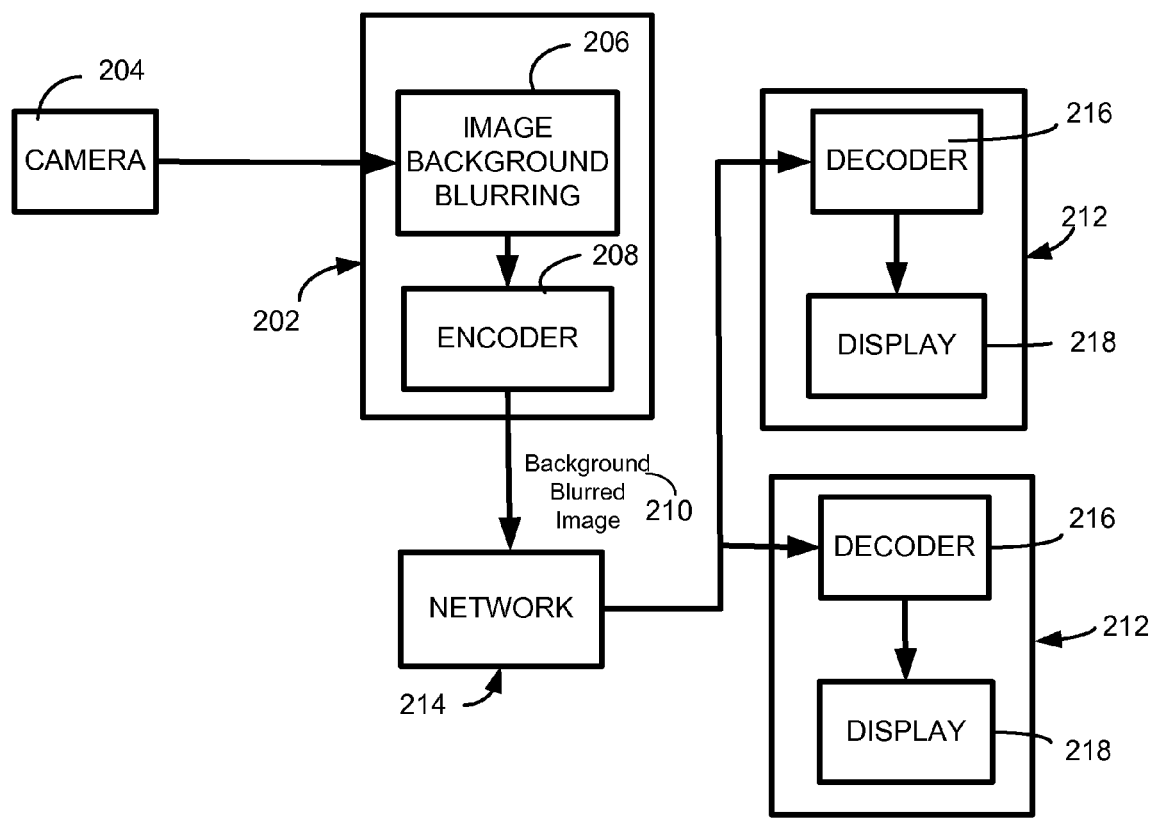
FIG. 2 is a diagram depicting an exemplary video conferencing environment wherein the present image background blurring technique can be practiced.

The exemplary operating environment having now been discussed, the remaining parts of this description section will be devoted to a description of the program modules embodying the present image background blurring technique. A more detailed view of an exemplary overall operating environment, such as would be found in a video conferencing application, is shown in FIG. 2.

2.0 Image Background Blurring Technique

The present image background blurring technique blurs the background in an image, such as one that would be used in video conferencing, instead of replacing the background completely. This has a number of advantages. First, as one would imagine, after background blurring, the foreground objects stay focused while the background objects are blurred. This protects the privacy of the person while maintaining an effective conversation. Second, people are much more forgiving to the errors made in background blurring than background replacement. This allows one to develop very efficient foreground/background classification procedures without much concern about classification errors. Finally, background blurring has the similar effect as a wide aperture video camera which always focuses on the foreground objects. It can make the foreground objects stand out as the background is blurred, creating an extra dimension to the video.

2.1 System and Process Overview

The present image background blurring technique can be deployed in a typical video conferencing environment. For example, in one embodiment, shown in FIG. 2, an image is input into a video conferencing participant's computing device 202 from a camera 204, and the image background blurring module 206 for blurring the background is inserted between the camera 204 and the encoding module 208. In this embodiment, the blurred encoded output image 210 is transmitted to one or more receiving video conference participants 212 over a network 214. The receiving participants 212 decode the transmitted encoded image via a decoder 216 to recover and display the video of the output image with the background blurred on their display 218. It should be noted that conventional encoders and decoders can be used to code and decode the image with the background blurred.

Figure 3:
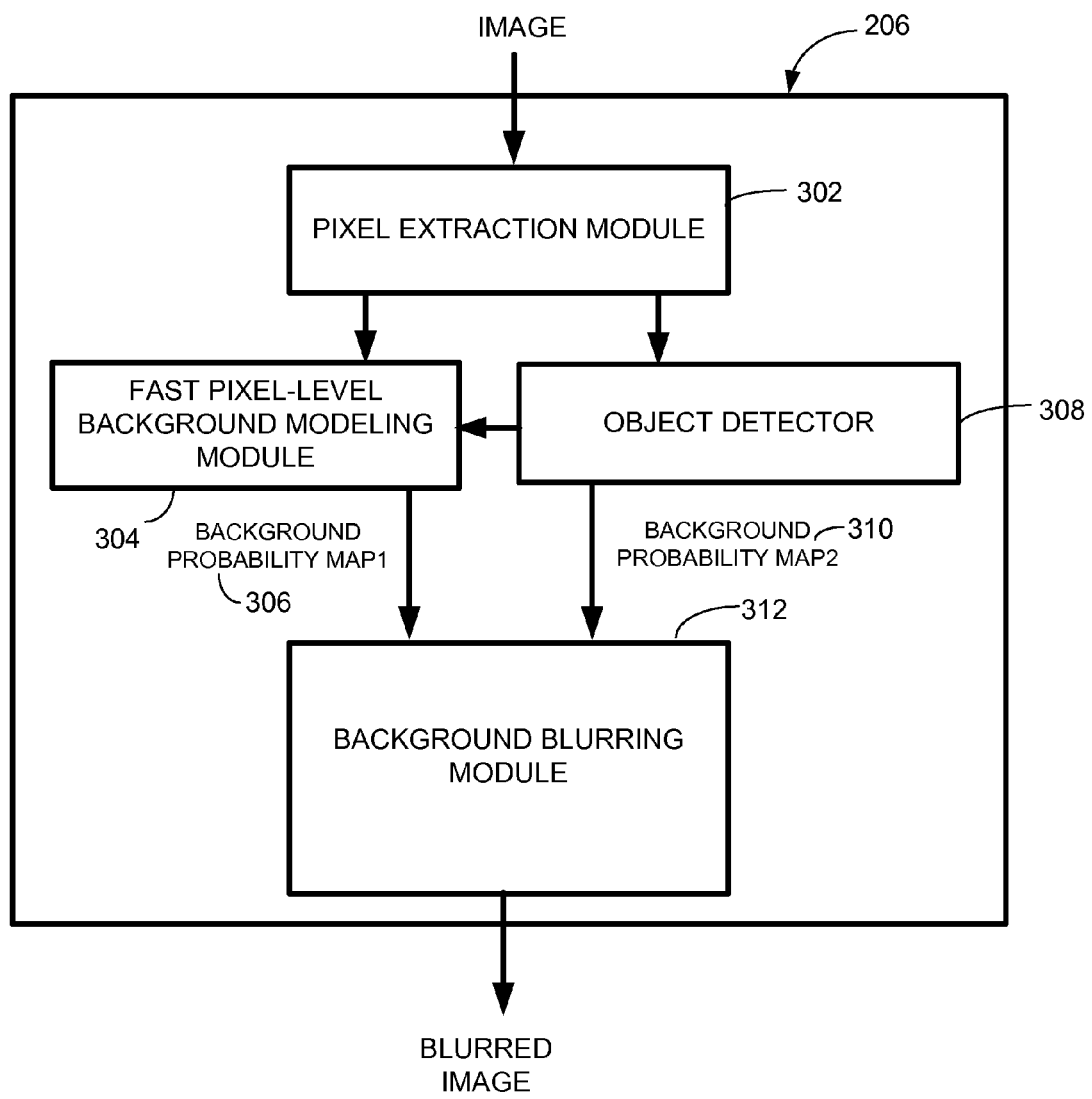
FIG. 3 is a block diagram depicting one embodiment of the image background blurring system described herein.

Referring to FIG. 3, in one embodiment, the image background blurring module divides an input image into pixels in a pixel extraction sub-module 302, and employs a fast pixel-level background modeling sub-module 304 that to performs foreground/background classification. With such a background model, a soft decision is made at each pixel as to how probable it is that it belongs to the background or foreground (i.e., is non-background), and a background probability map 306 is generated using these probabilities. It is noted that foreground objects can get blurred if they stay still for a long while. Faces are by far the most important objects that should always stay focused in video conferencing even though they are still. An object detector 308, such as a face detector/tracker, is employed with the above background modeling approach. Alternately, an object can be detected by a user and manually segmented out. The detected object (e.g., face) regions are used to generate a second background probability map 310. In addition, the object detector 308 can feed background probability data into the fast pixel-pixel level background modeling sub-module 304 so that it object pixels identified by the object detector will not be used in the background modeling done by the fast pixel-level background modeling sub-module 304. The background probability maps 306, 310 are then provided to a background blurring submodule 312, which is used to blur the background in the image or video frame. The second probability map 310 is used to modulate the blurring radius image, making sure that the objects (e.g., faces) are not blurred. These aspects of the present image background blurring technique will be discussed in greater detail below.

Figure 4:
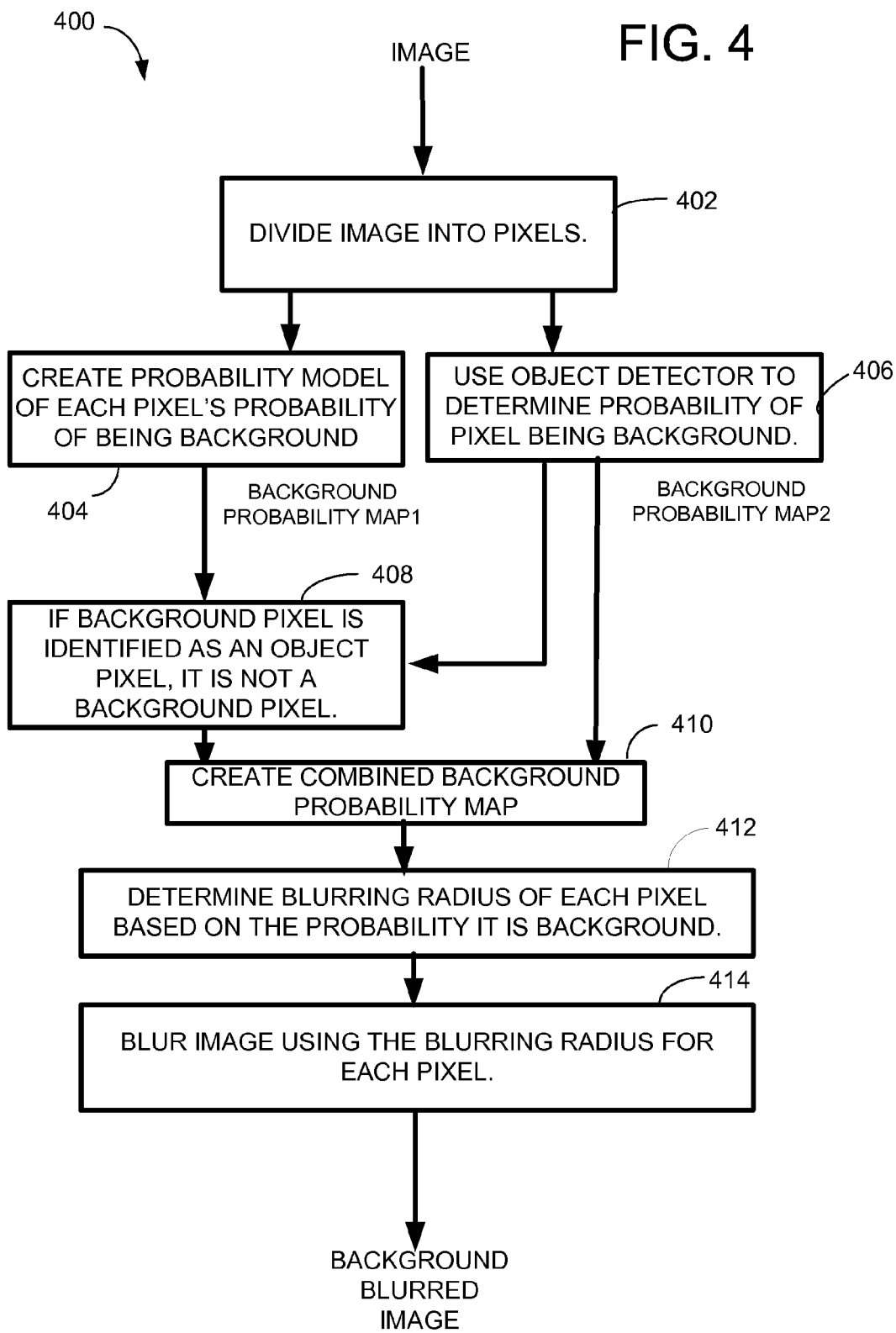
FIG. 4 is an exemplary flow diagram of one embodiment of the present image background blurring process.

FIG. 4 depicts a flow diagram of one embodiment of the present image background blurring process 400 disclosed herein. As shown in FIG. 4, process action 402, an input image is divided into pixels. A first background probability map that a pixel is a background pixel is created for each of the pixels in the image (process action 404). This first background probability map can be derived using a variety of conventional methods, but is preferably created by using a Gaussian distribution method, which will be described in more detail below. Additionally, an object detector/tracker (e.g., a face detector/tracker) is used to detect and track an object such as a face, thereby deriving a second object detector background probability map that a pixel is background or foreground, as shown in process action 406. In general, this process action designates objects as non-background. Any pixel determined in the background modeling process to be background, but that is determined by the object detector to be an object, is designated as non-background (process action 408). A combined probability map is created from the first and second probability maps, as shown in process action 410. A blurring radius of each pixel is then determined based on the probability it is background using the combined probability map, as shown in process action 412. The image is then blurred using the blurring radius for each pixel (process action 414), resulting in a background blurred image.

The following sections provide details and variations of the image background blurring technique described above.

2.2 Fast Pixel-Level Background Modeling

Fast pixel level background modeling has been extensively studied in literature. Gaussian distributions have been used to model the color variation of the background pixels, mostly for indoor environments. This was later extended to Gaussian mixture models, non-parametric kernel density estimators and three state Hidden Markov Models to adapt to outdoor, dynamic backgrounds. A separate region-level or even object-level model can be added to further improve the background modeling quality in dynamic scenes.

Since most video conferencing applications are indoors, a single Gaussian distribution is typically sufficient to model the color variations of background pixels. Another reason to use a single Gaussian distribution is its simplicity and efficiency in implementation.

Figure 5:
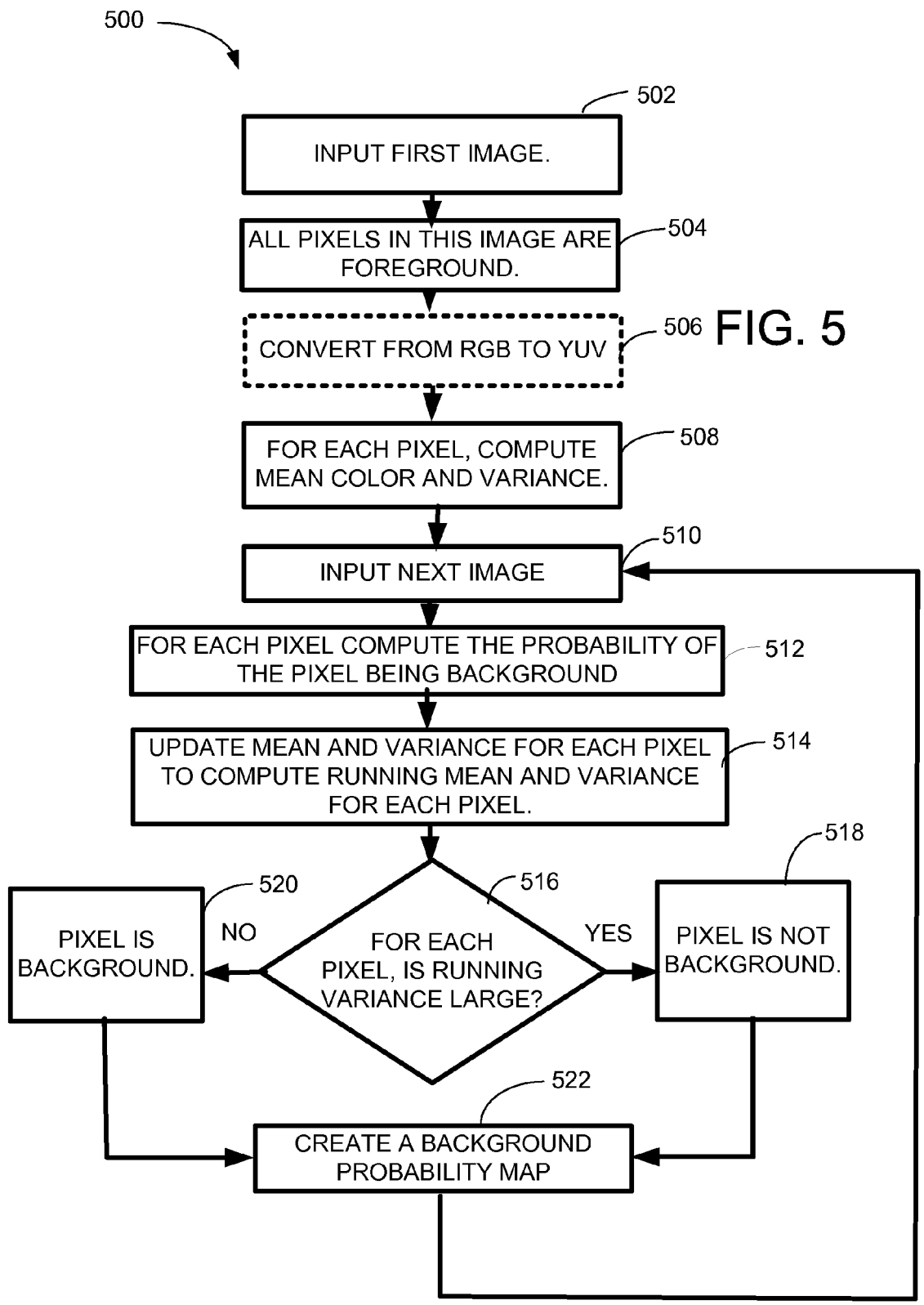
FIG. 5 is an exemplary flow diagram of one embodiment of the background modeling process used in one embodiment of the present image background blurring process.

The background modeling process 500 used in one embodiment of the image background blurring technique is shown in FIG. 5. In this embodiment, a first image of an image sequence is input, as shown in process action 502. Initially all pixels in this image are designated as foreground (process action 504). In one version, to simplify computations, if the image is in red, green, blue (RGB) color space it is converted to YUV color space (process action 506). As shown in process action 508, for each pixel, a mean color and variance are computed. The next image in the image sequence (e.g., video sequence) is then input, as shown in process action 510. The probability of each pixel in this image belonging to the background is computed (e.g., using a Gaussian model) (process action 512). The mean and variance for each pixel are computed using the last-computed pixel probabilities, and a running mean and variance are created/maintained (process action 514). A check is then made to see if the variance is large (process action 516). If the variance is large, the pixel is designated as not being background (process action 518). If the variance is not large, the pixel is designated as being background (process action 520). A probability map of each pixel being background is then created using the pixel classification results, as shown in process action 522. The process so continues for the remaining image sequence by repeating actions 510-522 for each image.

More particularly, let an input video frame be $I_t$ at time t. Let $c_t(x)$ be the color of the pixel at location x in $I_t$. To make the background model robust to lighting variations, and to simplify computations, convert the video frame from the RGB color space to the YUV color space, and only use the UV components for the task. Thus $c_t(x)$ is a two dimensional vector. Initially, all pixels are assumed to be foreground pixels. Let the initial mean color be $$m_0(x) = [-1\ -1]^T, \text{ and } \sum_0(x) = \epsilon I,$$

where I is a two dimensional identity matrix and $\epsilon$ is a tiny number (e.g., $10^{-3}$).

At each pixel, a background mean and a background variance is computed, denoted as $m_t(x)$ and $$\sum_t(x),$$

respectively.

Given a new input frame, the likelihood of a pixel belonging to the background can be computed using the standard Gaussian kernel:

$$p_t = \exp\left\{-\frac{1}{2}(c_t - m_{t-1})^T (\sum_{t-1})^{-1}(c_t - m_{t-1})\right\} \quad (1)$$

Here the pixel location variable x is ignored for conciseness. If this probability is above a certain threshold, e.g., $p_t > 0.2$, the new pixel will be used to update the background model as:

$$\sum_t = (c_t - m_{t-1})(c_t - m_{t-1})^T + (1-\alpha)\sum_{t-1} \quad (2)$$

$$m_t = \alpha c_t + (1-\alpha)m_{t-1} \quad (3)$$

where $\alpha$ is a decay factor indicating the updating rate. The above updating mechanism can handle slow background variations very well.

Another functionality that is needed in background modeling is the ability to push a pixel into the background if its color does not change for a long period of time. To enable this, a running mean $\mu_t(x)$ and a running variance $\Omega_t(x)$ are computed for each pixel. Whenever a new frame comes in, these running means and variances are updated similarly as:

$$\Omega_t = \alpha(c_t - \mu_{t-1})(c_t - \mu_{t-1})^T + (1-\alpha)\Omega_{t-1} \quad (4)$$

$$\mu_t = \alpha c_t + (1-\alpha)\mu_{t-1} \quad (5)$$

Initially $\mu_0(x)=c_0(x)$ and $\Omega_0(x)=\rho I$, where $\rho$ is a big number (e.g., 20). If a pixel's color remains constant for a long period, the trace of the covariance matrix $\Omega_t$ will decrease. If the trace is smaller than a certain threshold, the pixel will be push into the background, i.e., one sets $m_t(x)=\mu_t(x)$ and $$\sum_t(x) = \Omega_t(x).$$

A pixel background probability map is thus created using this information for each pixel.

2.3 Object (Face) Detection and Tracking

The background modeling procedure described in Section 2.2 works reasonably well if the foreground person is constantly moving. Unfortunately, many people do not move around all the time during a video conferencing session. When a person stays still for a while, the above procedure will gradually merge the foreground pixels into the background, generating a blurry foreground person. While more sophisticated algorithms exist for background modeling, they inherently suffer from the same problem.

It is observed that in video conferencing applications, the face is by far the most important foreground object that should always be in focus. Therefore, as discussed previously, an object detector and tracker (e.g., a face detector and a face tracker) can be adopted to identify foreground objects, such as, for example, the face region, in order to remedy the above-mentioned problem.

Figure 6:
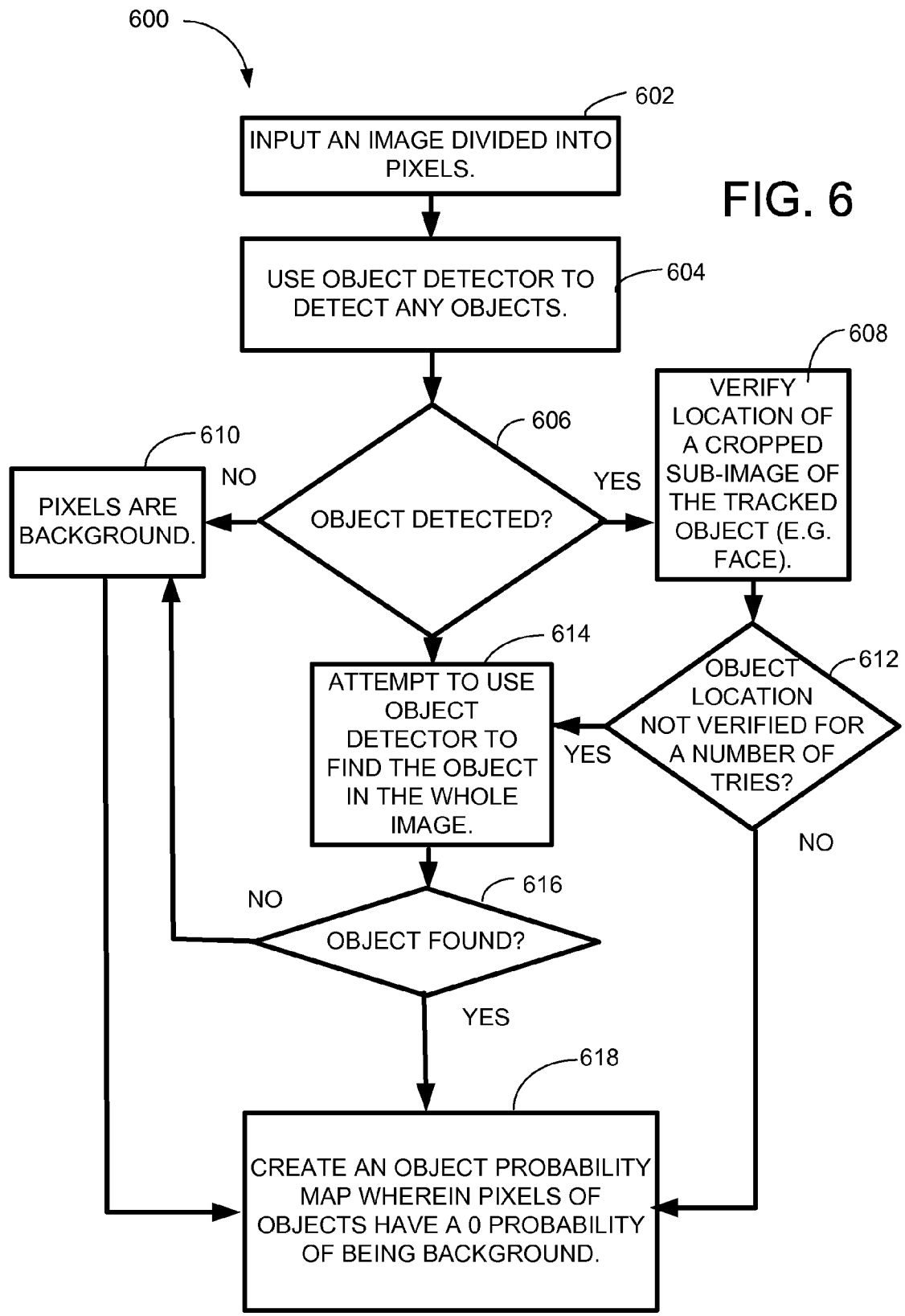
FIG. 6 is an exemplary flow diagram of one embodiment of the object detection process used in one embodiment of the present image background blurring process.

The object detection process 600 employed in one embodiment of the image background blurring technique is shown in FIG. 6. An image divided into pixels is input, as shown in process action 602. The object detector (e.g., face detector) is used to detect any objects, such as, for example a face, in order to classify pixels of the object on a per-pixel basis (process action 604). If an object is detected, the location of a cropped sub-image of the object (e.g., a face) is verified by comparing it to the location of the cropped sub-image in the same area of the image in a previous frame in order to verify the pixels belong to the object (process action 606, 608). If the location of the object is not verified for a number of tries, the object detector is used in an attempt to find the object in the whole image (process actions 612, 614). If the object is not found, the pixels in question are held to be background pixels (process actions 616, 610). If the object is verified (process action 612), or the object is found in searching the whole image (process action 616), the object is not background and is assigned 0 probability of being background. Hence, a probability map is created for all the pixels in the image wherein pixels of any object have a 0 probability of being background pixels, as shown in process action 618.

It should be noted that any conventional object detector can be used with the image background blurring technique. However, in one exemplary working embodiment, the object detector is a face detector that employs a three-step detector consisting of a linear pre-filter, a boosting chain and a number of post filtering algorithms such as support vector machine and color filters. The detector has a high detection rate for frontal faces with low false alarms thanks to the post-filters, however its detection rate on profile faces is relatively low and it is too expensive to run the detector on every video frame. The image background blurring technique combines the detector with a color-based non-rigid object tracker called pixel classification and integration (PCI). PCI has a number of advantages over the popular mean-shift (MS) algorithm. It guarantees a global optimal solution rather than a local optimal solution in MS. PCI is also computationally more efficient than MS, with better scale adaptation and appearance modeling. The face detector in the working embodiment is used as both a detector and a verifier for the process. In one embodiment, if no face is detected in the image, the detector will be fired once every second. Otherwise, it is used to verify the sub-image cropped by the tracked face twice a second. If a face is not verified for a number of tries, the detector is launched again for a whole image detection. The detected/tracked faces may be expanded slightly up and down to cover the hair and the neck of the person. In this working embodiment, the image background blurring technique then generates a face background likelihood map as:

$f_t(x)=0$ if the pixel belongs to a face 1 otherwise. (6)

That is, pixels belonging to a face have probability 0 as background, and 1 otherwise. In addition, if a pixel belongs to a face region, it will not be pushed into the background model in the fast pixel-level background modeling no matter how small the running variance, $\Omega_t(x)$, is. (See Section 2.2)

2.4 Background Blurring

Figure 7:
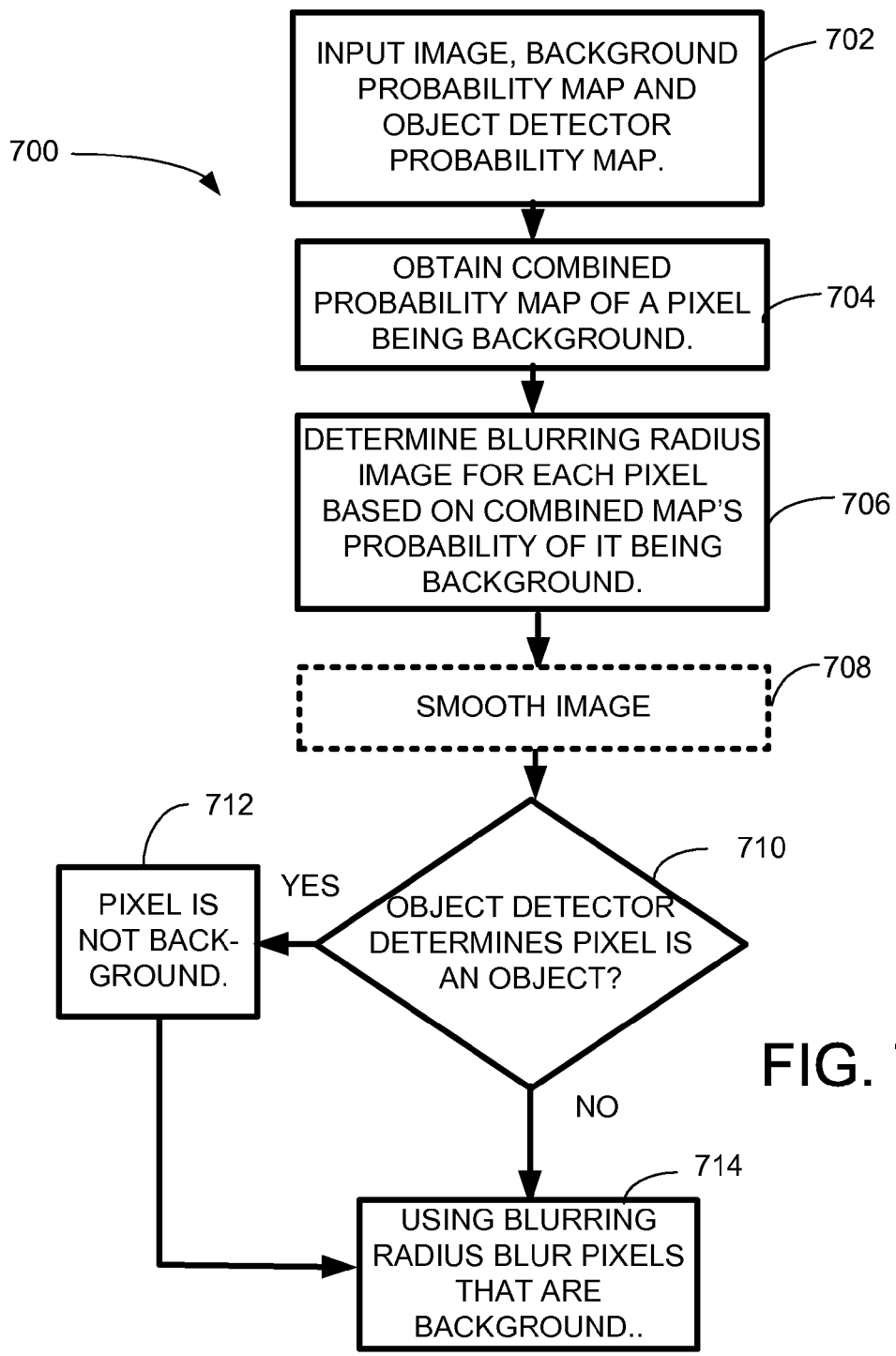
FIG. 7 is an exemplary flow diagram of the background blurring process used in one embodiment of the present image background blurring process.

The background blurring procedure 700 used in one embodiment of the image background blurring technique is shown in FIG. 7. An image and its associated background probability map and object detector probability map (the probability map derived by using the object detector) are input, as shown in process action 702. A combined probability map for each pixel in the image is computed by combining the two input probability maps, as shown in process action 704. A blurring radius for each pixel is then determined based on the likelihood of it being background which obtained from the combined probability map (process action 706). The image can optionally also be smoothed (process action 708). If the object detector has determined that a given pixel belongs to an object, the pixel is not blurred (process actions 710, 712). If the object detector has not determined that the pixel is an object, the pixel is blurred using the blurring radius, as is shown in process action 714. The blurring process is repeated for each subsequent image in the sequence.

Mathematically, the above discussed blurring process can be explained as follows. The two background likelihood maps are combined into one for background blurring. Let:

$q_t(x)=\min(p_t(x), f_t(x))$. (7)

where $q_t(x)$ is the combined probability map, $p_t(x)$ is the background probability map and $f_t(x)$ is the object detector probability map.

In one embodiment, the image background blurring technique maps this combined likelihood image into a blurring radius image as:

$$r_t(x) = r_{max}\min\left(1, \frac{q_t(x)}{\delta}\right)$$ (8)

where $r_{max}$ is the maximum blurring radius set by the user, $\delta$ is a small thresholding probability. If $q_t(x)$ is greater than $\delta$, the pixel will be fully blurred. In one working embodiment it was found that $\delta=0.01$ works well. The blurring radius image is then used to blur the original image. That is, for each pixel, the corresponding blurring radius is used to blur the input image by averaging pixels within the radius. This can be done using various methods, such as Gaussian methods. For example, various kernels can be used such as Gaussian or rectangular kernels.

Figure 8:
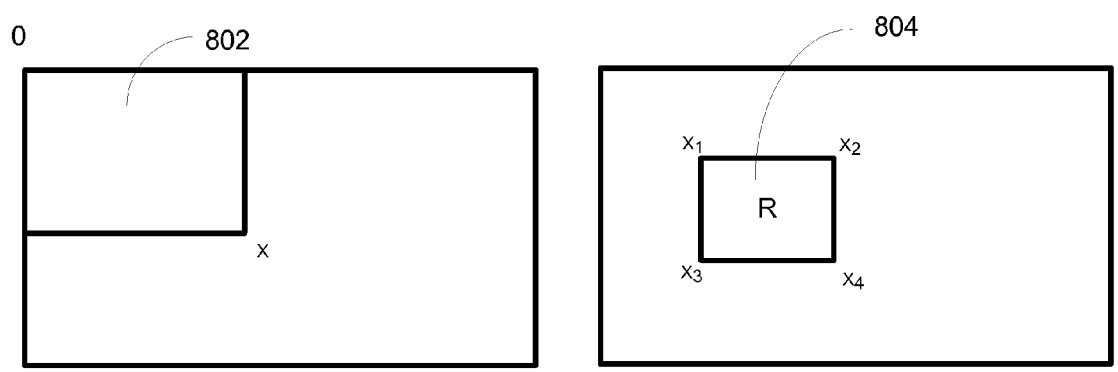
FIG. 8 depicts a diagram for calculating an integral image to be used in computing a blurring radius for blurring the pixels in one embodiment of the present image background blurring process. On the left the integral image is calculated. On the right the sum of colors in region R is computed.

One challenge that is faced during the blurring process is that it can be very computationally expensive, because each pixel can have a different blurring radius. When the maximum blurring radius $r_{max}$ is large, the adaptive blurring procedure can be very slow. Fortunately, for certain blurring kernels such as the rectangular kernel, this procedure can be greatly sped up with the help of integral images. As shown in FIG. 8, the integral image is calculated as:

$$C_t(x) = \sum_{z \in R(0,x)} c_t(z). \tag{9}$$

where R(0,x) is the rectangular region formed by the origin and x, as shown in the region 802 in the figure on the left. The computational cost for calculating the integral image is low—two additions for each pixel in the image.

After the integral image has been calculated, the sum of colors in an arbitrary rectangular region 804 can be computed with 3 additions, as shown in FIG. 8 on the right. The sum of the colors in Region R is computed as $$\sum_{x \in R(0,x)} C_t(x_4) + C_t(x_1) - C_t(x_2) - C_t(x_3) \tag{10}$$

The blurred pixel is thus the sum of pixels within the radius divided by the size of the rectangular region, which can be computed efficiently for arbitrary size of neighbors.

3.0 Other Embodiment

Figure 9:
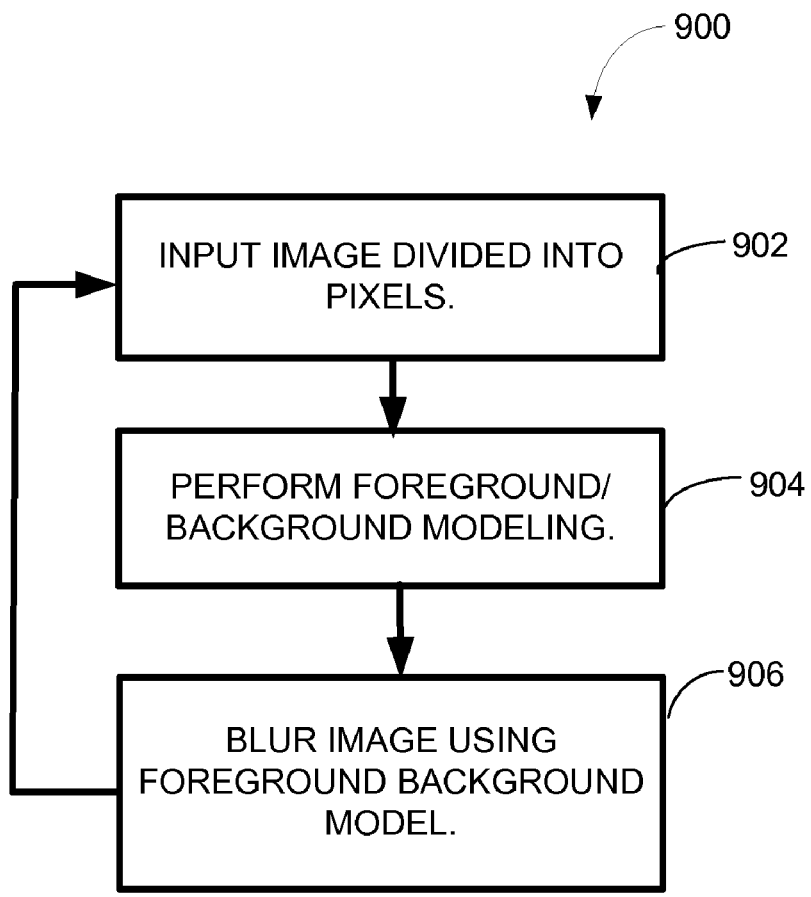
FIG. 9 depicts an alternate embodiment of the image background blurring process described herein that does not employ an object or face detector/tracker.

In an alternate embodiment, the image background blurring process does not employ an object or face detector/tracker. In this embodiment 900, shown in FIG. 9, an image of an image sequence is divided into pixels, process action 902. Foreground/background background modeling is then conducted, as shown in process action 904, to yield a background pixel probability map defining how likely it is that each pixel in the image is a background pixel. It should be noted that any background modeling technique can be used to determine whether a pixel belongs to the background or not. The background probability map is then used to blur each pixel based on its probability of being a background pixel, as shown in process action 906.

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for blurring the background in an image of an image sequence, comprising using a computer to perform the process actions of:
    (a) dividing an image of an image sequence into pixels;
    (b) creating a first probability map of each pixel's probability of being a background pixel;
    (c) using an object detector to find an object in the image and using any found object to determine the probability of each pixel being background thereby creating a second probability map;
    (d) specifying that each pixel in the first probability map is not background, if it was determined by the object detector to belong to an object;
    (e) combining the first and second probability maps to obtain a combined probability map that defines a probability of each pixel in the image being a background pixel;
    (f) determining a blurring radius for each pixel based on its probability of being a background pixel; and
    (g) blurring each pixel in the image using the blurring radius for each pixel to create an output image with a blurred background.

2. The computer-implemented process of claim 1 further comprising repeating process actions (a) through (g) for subsequent images in the image sequence.

3. The computer-implemented process of claim 1 wherein the process action of creating the first probability map, comprises the process actions of:
    inputting a first image of an image sequence;
    designating all pixels in the first image as foreground;
    for each pixel in the first image, computing a mean color and a variance;
    inputting the next image in the image sequence;
    for each pixel in the next image, determining the probability of it being a background pixel;
    updating the mean color and variance, using the probability of each pixel in said next image being a background pixel, to compute a running mean and variance for each pixel;
    for each pixel, determining if the running variance is large;
        if the running pixel variance is large, classifying the pixel as not being a background pixel;
        if the running pixel variance is not large, classifying the pixel as being a background pixel; and
    creating a probability map that each pixel is background based on the pixel classifications.

4. The computer-implemented process of claim 3 wherein the process action of determining the probability of a pixel belonging to the background is computed using a standard Gaussian kernel.

5. The computer-implemented process of claim 3 wherein each pixel in the input image is converted from red, green, blue (RGB) color space to YUV color space prior to computing a mean color and variance.

6. The computer-implemented process of claim 1 wherein the process action of using an object detector to find an object in the image and using any found object to determine the probability of a pixel being background thereby creating a second probability map, comprises the process actions of:
    (a) inputting the image divided into pixels;
    (b) using an object detector to detect any objects in the image;
        if an object is detected,
            verifying the location of a cropped sub-image of the object;
            if the location of cropped sub-image of the object has not been verified for a number of tries, attempting to use the object detector to find the object in the whole image;
                if the object is not found, designating all pixels as background,
                if the object is found, designating each pixel in the image belonging to the object as having a 0 probability of being background;
        if an object is not detected,
            designating all pixels as background; and (c) creating the second probability map by using the designation for each pixel.

7. The computer-implemented process of claim 1 wherein the object detector is a face detector and the object detected is a face.

8. The computer-implemented process of claim 1 wherein the process action of blurring each pixel in the image using the blurring radius for each pixel to create an output image with a blurred background, comprises the process actions of:
   obtaining a combined probability derived from the first and second probability maps of each pixel in the image being background;
   determining a blurring radius for each pixel based on the probability of it being background obtained from the combined probability map;
   using the second probability map created by using the object detector to specify that pixels that belong to objects are not background; and
   using the blurring radius to blur pixels that are background.

9. The computer-implemented process of claim 8 further comprising the process action of smoothing the image after the blurring radius for each image has been determined.

10. The computer-implemented process of claim 1 wherein the blurring radius is larger if the probability is higher that the pixel is background.

11. The computer-implemented process of claim 1 wherein the background in the image is blurred by using the corresponding blurring radius for each pixel and averaging the pixel colors within the radius.

12. The computer-implemented process of claim 1 wherein a Gaussian distribution with a rectangular kernel is used in determining each blurring radius, and wherein integral images are used in determining each blurring radius.

13. A system for blurring the background in an image, comprising:
   a general purpose computing device;
   a computer program comprising program modules executable by the general purpose computing device, wherein the computing device is directed by the program modules of the computer program to,
   divide an input image into pixels;
   perform background modeling to determine a first probability map that each pixel in the image is background;
   perform object detection to find an object and specify that pixels of any object detected are not background pixels to create a second probability map that each pixel in the image is background;
   perform image background blurring using a combination of first and second probability maps that each pixel in the image is background to create an image with a blurred background.

14. The system of claim 13 wherein object detection is performed by a user manually segmenting an object from background in the input image.

15. The system of claim 13 wherein object detection is automatically performed by using an object detector.

16. The system of claim 13 wherein the program module to perform image background blurring comprises:
   for each pixel, averaging colors of the pixels in an area corresponding to the probability that a pixel is background, and replacing the pixel color with the averaged color.

* * * * *